(12) United States Patent
Ederle et al.

(10) Patent No.: US 11,823,187 B2
(45) Date of Patent: Nov. 21, 2023

(54) SYSTEMS AND METHODS FOR LINKING AUTHENTICATIONS IN CONNECTION WITH NETWORK INTERACTIONS

(71) Applicant: MASTERCARD INTERNATIONAL INCORPORATED, Purchase, NY (US)

(72) Inventors: Robert Albert Ederle, Chesterfield, MO (US); Mark B. Hey, St. Peters, MO (US); Kris Lowell Donaldson, Chesterfield, MO (US); Gregory S. Kriebaum, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 41 days.

(21) Appl. No.: 17/332,563

(22) Filed: May 27, 2021

(65) Prior Publication Data
US 2021/0374747 A1 Dec. 2, 2021

Related U.S. Application Data

(60) Provisional application No. 63/032,057, filed on May 29, 2020.

(51) Int. Cl.
*G06Q 20/40* (2012.01)
*G06Q 20/38* (2012.01)
*G06Q 20/06* (2012.01)

(52) U.S. Cl.
CPC ....... *G06Q 20/4012* (2013.01); *G06Q 20/065* (2013.01); *G06Q 20/389* (2013.01); *G06Q 20/405* (2013.01)

(58) Field of Classification Search
CPC ............. G06Q 20/4012; G06Q 20/065; G06Q 20/389; G06Q 20/405
See application file for complete search history.

(56) References Cited

U.S. PATENT DOCUMENTS 8,036,978 B1 * 10/2011 Saavedra-Lim ....... G06Q 40/02
705/38
8,121,923 B1 * 2/2012 Ruccolo ................. G06Q 40/04
705/40

(Continued)

FOREIGN PATENT DOCUMENTS

WO WO-2020027866 A1 * 2/2020 ............. G06F 21/10

*Primary Examiner* — Jacob C. Coppola
*Assistant Examiner* — Terry Nathan Murray
(74) *Attorney, Agent, or Firm* — Harness, Dickey & Pierce, P.L.C.

(57) ABSTRACT

Systems and methods are provided for associating authentications and authorizations in connection with network interactions. An exemplary system includes a computing device configured to receive an authorization request for a network interaction from an acquirer, where the authorization request includes a primary account number (PAN) for a payment account and a transaction amount. The computing device is also configured to determine whether the authorization request includes an accountholder authentication value (AAV) and/or a transaction identifier (ID). In response to the authorization request including the AAV and the transaction ID, the computing device is configured to determine whether the AAV and the transaction ID are included in a data structure and, in response to them being included in the data structure, append a tag to the authorization request indicative of association of the authorization request to an authentication in the data structure associated with the AAV and the transaction ID.

11 Claims, 5 Drawing Sheets

(56) References Cited

U.S. PATENT DOCUMENTS

| | | |
|---|---|---|
| 2008/0040285 A1 | 2/2008 | Wankmueller |
| 2011/0006113 A1 | 1/2011 | Uchikura |
| 2015/0081349 A1* | 3/2015 | Johndrow ............ G06Q 20/405 |
| | | 705/5 |
| 2017/0046758 A1 | 2/2017 | Sheehan et al. |
| 2018/0060862 A1* | 3/2018 | Groarke ............. G06Q 30/0601 |
| 2018/0082298 A1 | 3/2018 | Modi et al. |
| 2018/0121913 A1 | 5/2018 | Unnerstall et al. |
| 2019/0295076 A1* | 9/2019 | Dimmick ............... G06Q 20/40 |
| 2020/0372495 A1* | 11/2020 | Maheshwari ...... G06Q 20/3678 |
| 2021/0158349 A1* | 5/2021 | Wardman ............... G06Q 20/20 |

* cited by examiner

SYSTEMS AND METHODS FOR LINKING AUTHENTICATIONS IN CONNECTION WITH NETWORK INTERACTIONS

CROSS-REFERENCE TO RELATED APPLICATION

This application claims the benefit of and priority to U.S. Provisional Application No. 63/032,057, filed May 29, 2020. The entire disclosure of the above application is incorporated herein by reference.

FIELD

The present disclosure generally relates to systems and methods for use in linking authentications in connection with network interactions.

BACKGROUND

This section provides background information related to the present disclosure which is not necessarily prior art.

Users are known to interact with different entities for a variety of reasons. From time to time, as part of the interactions, the entities desire to authenticate the users to confirm identities of the users (to ensure the users they are interacting with are the correct users, as compared to fraudulent users claiming to be users).

Specifically, in the context of payment transactions, users may be authenticated to inhibit and/or prevent fraudulent or unauthorized transactions. For example, when initiating a card-present payment transaction, a user may be required to provide a signature (consistent with a signature on the back of a payment card) or enter a PIN for the transaction to proceed. EMV technology has also been employed to authenticate users in connection with payment transactions, where chips included in payment cards cooperate with point-of-sale terminals to generate cryptograms for the transactions, which are then validated prior to approval of the transactions by issuers of corresponding payment accounts (or by parties on behalf of the issuers). Further, payment networks also often provide enhanced authentication techniques in processing card-not-present payment transactions, via utilization of the 3-D Secure™ specification, which relies on 3DS Server software (3DSS) at merchants involved in the payment transactions and on access control servers (ACSs) associated with the issuers to perform such authentication. In connection therewith, the 3-D Secure™ specification is also known to be used for online transactions in which risks associated with unauthorized use of payment accounts may be increased.

SUMMARY

This section provides a general summary of the disclosure, and is not a comprehensive disclosure of its full scope or all of its features.

The present disclosure generally relates to systems and methods for use in associating authentications and authorizations, for example, in connection with network interactions.

In one exemplary embodiment, a computer-implemented method for use in associating an authentication and an authorization in connection with a network interaction includes receiving, by at least one computing device, an authorization request for a network interaction from an acquirer computing device, where the authorization request includes a primary account number (PAN) for a payment account and a transaction amount for the network interaction; determining, by the at least one computing device, whether the authorization request includes an accountholder authentication value (AAV); and determining, by the at least one computing device, whether the authorization request includes a transaction identifier (ID). And then, in response to the authorization request including the AAV and the transaction ID, the method includes determining, by the at least one computing device, whether the AAV and the transaction ID are included in a data structure of the network; and in response to the AAV and the transaction ID being included in the data structure, appending, by the at least one computing device, a tag or code to the authorization request indicative of an association of the authorization request to an authentication included in the data structure and associated with the AAV and the transaction ID and transmitting the authorization request to an issuer of the payment account.

In another exemplary embodiment, a computer-implemented method for use in associating an authentication and an authorization in connection with a network interaction includes receiving, by at least one computing device, an authorization request for a network interaction from an acquirer computing device, where the authorization request includes a primary account number (PAN) for a payment account and a transaction amount for the network interaction; determining, by the at least one computing device, whether the authorization request includes an accountholder authentication value (AAV); determining, by the at least one computing device, whether the authorization request includes a transaction identifier (ID); and determining, by the at least one computing device, whether a currency included in a data structure and associated with the transaction ID and the AAV is consistent with a currency included in the authorization request. And then, in response to the currency included in the data structure being inconsistent with the currency included in the authorization request, the method includes appending, by the at least one computing device, a tag or code to the authorization request indicative of a currency mismatch in the authorization request and transmitting the authorization request to an issuer of the payment account.

In another exemplary embodiment, a computer-implemented method for use in associating an authentication and an authorization in connection with a network interaction includes receiving, by at least one computing device, an authorization request for a network interaction from an acquirer computing device, where the authorization request represents a transaction to a payment account and includes a transaction amount for the network interaction and an accountholder authentication value (AAV) indicative of a prior authentication associated with the transaction; determining, by the at least one computing device, whether the authorization request, the transaction amount and/or an interval associated with the authorization request satisfies at least one parameter, wherein the at least one parameter includes a merchant authentication parameter and/or a default authentication parameter; and in response to the authorization request, the transaction amount and/or the interval associated with the authorization request failing to satisfy the at least one parameter, appending, by the at least one computing device, a tag or code to the authorization request indicative of the at least one parameter and transmitting the authorization request to an issuer of the payment account.

In another exemplary embodiment, a computer-implemented method for use in associating an authentication and an authorization in connection with a network interaction includes receiving, by the at least one computing device, a service request for a network interaction, from an issuer of a payment account, apart from an interface processor, where the service request includes an accountholder authentication value (AAV) indicative of a prior authentication, a transaction identifier (ID) for a transaction, and at least one of a transaction amount and a currency for the transaction; verifying, by the at least one computing device, the at least one of the transaction amount and the currency in a data structure, based on the AAV and the transaction ID; and compiling and transmitting, by the at least one computing device, a service response, to the issuer, in response to the service request, indicating verification of the at least one of the transaction amount and the currency.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustrative purposes only of selected embodiments and not all possible implementations, and are not intended to limit the scope of the present disclosure:

Figure 1:
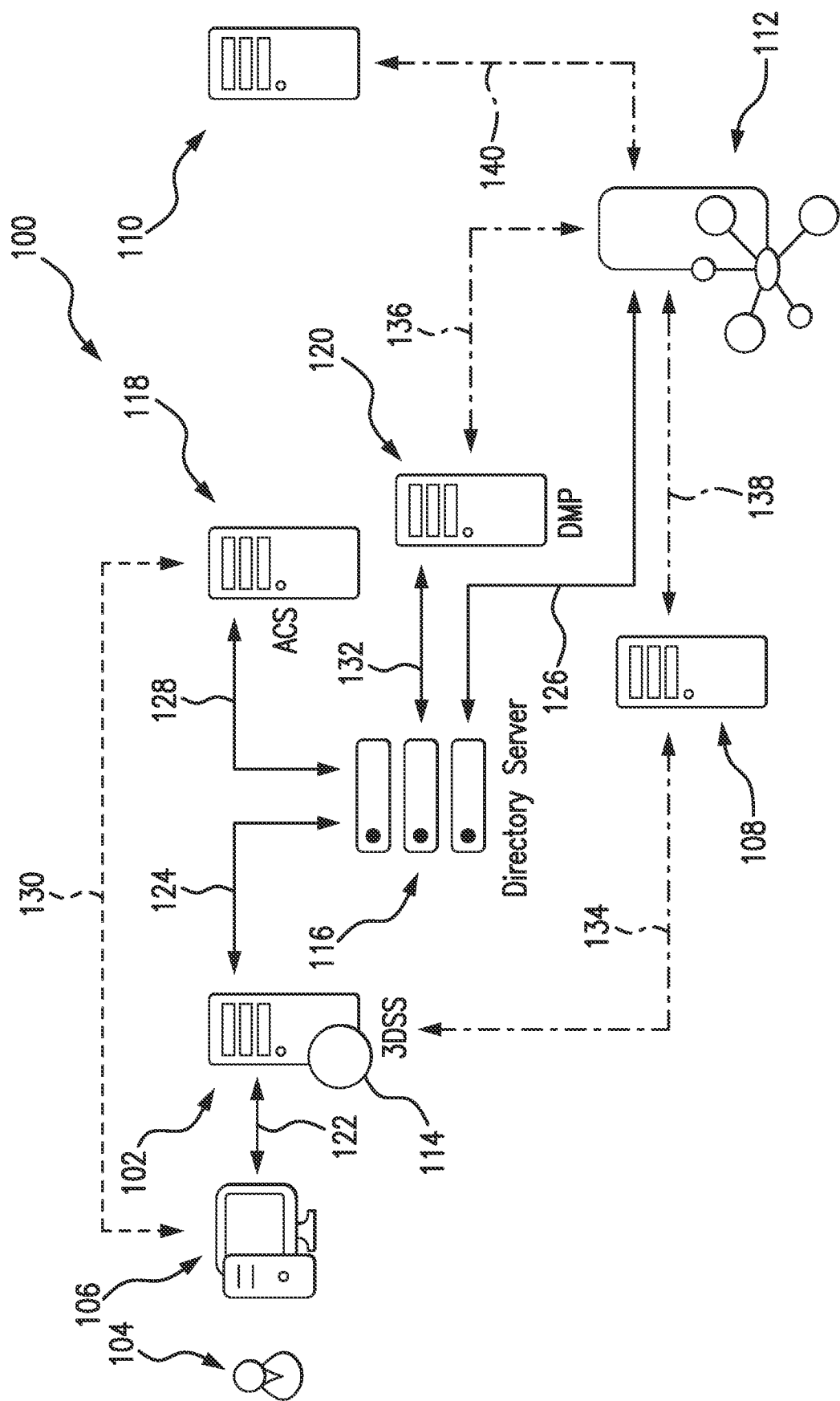
FIG. 1 illustrates an exemplary system for use in matching authentications of users in connection with authorizations of network interactions involving the users.
Figure 3:
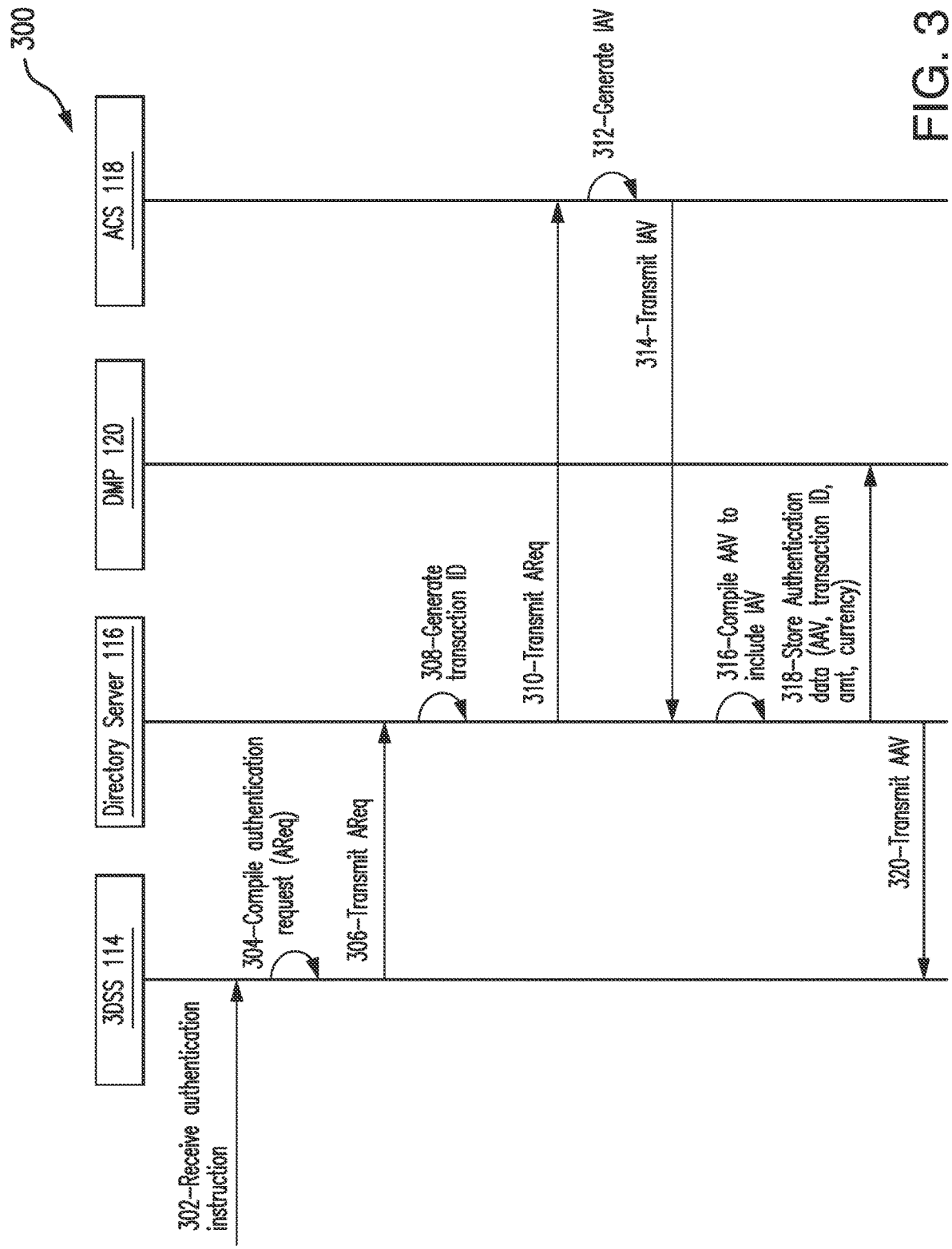
FIG. 3 illustrates an exemplary method that may be implemented via the system of FIG. 1, for authenticating a user in connection with a network interaction between the user and a merchant.
Figure 4:
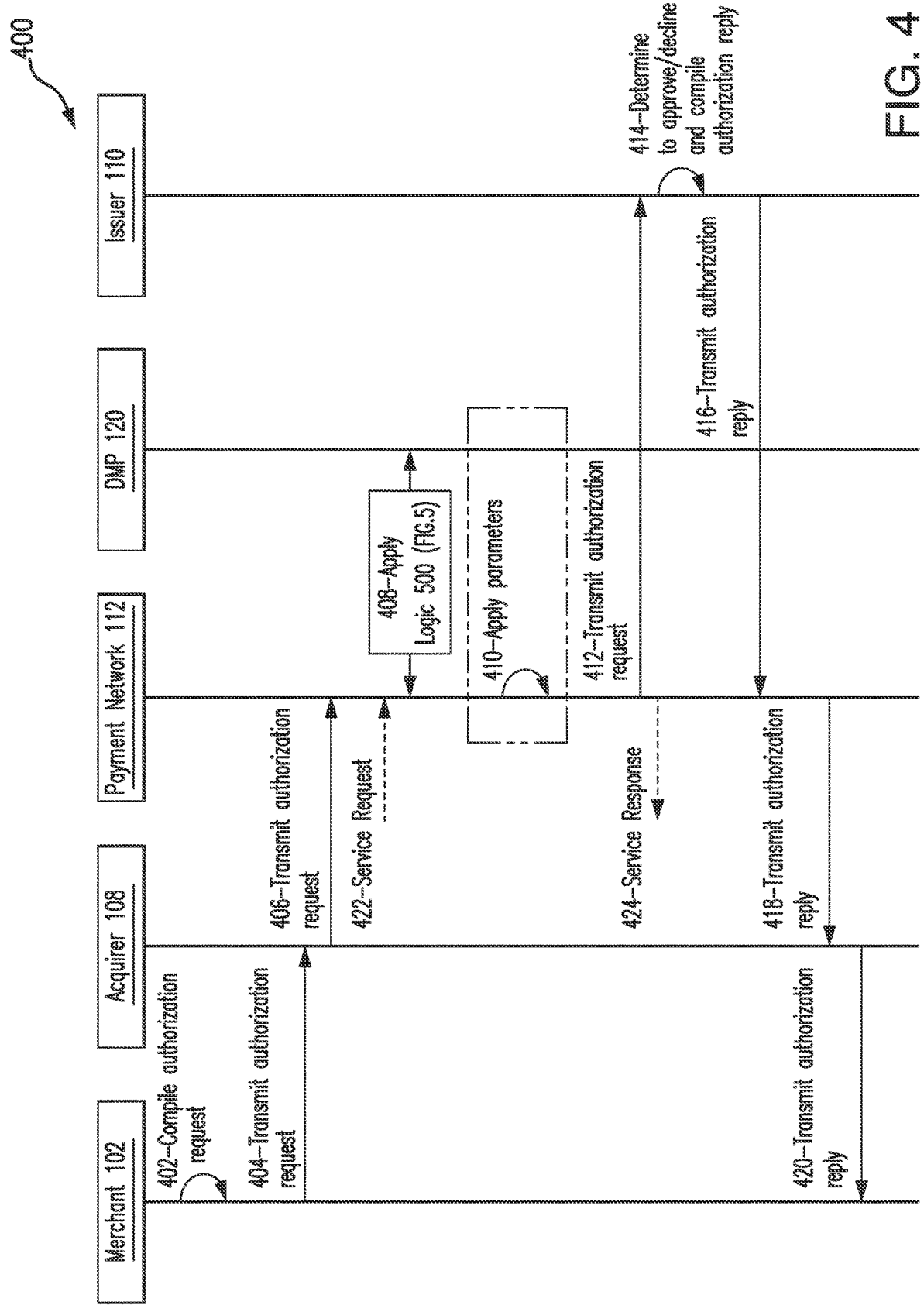
Figure 5:
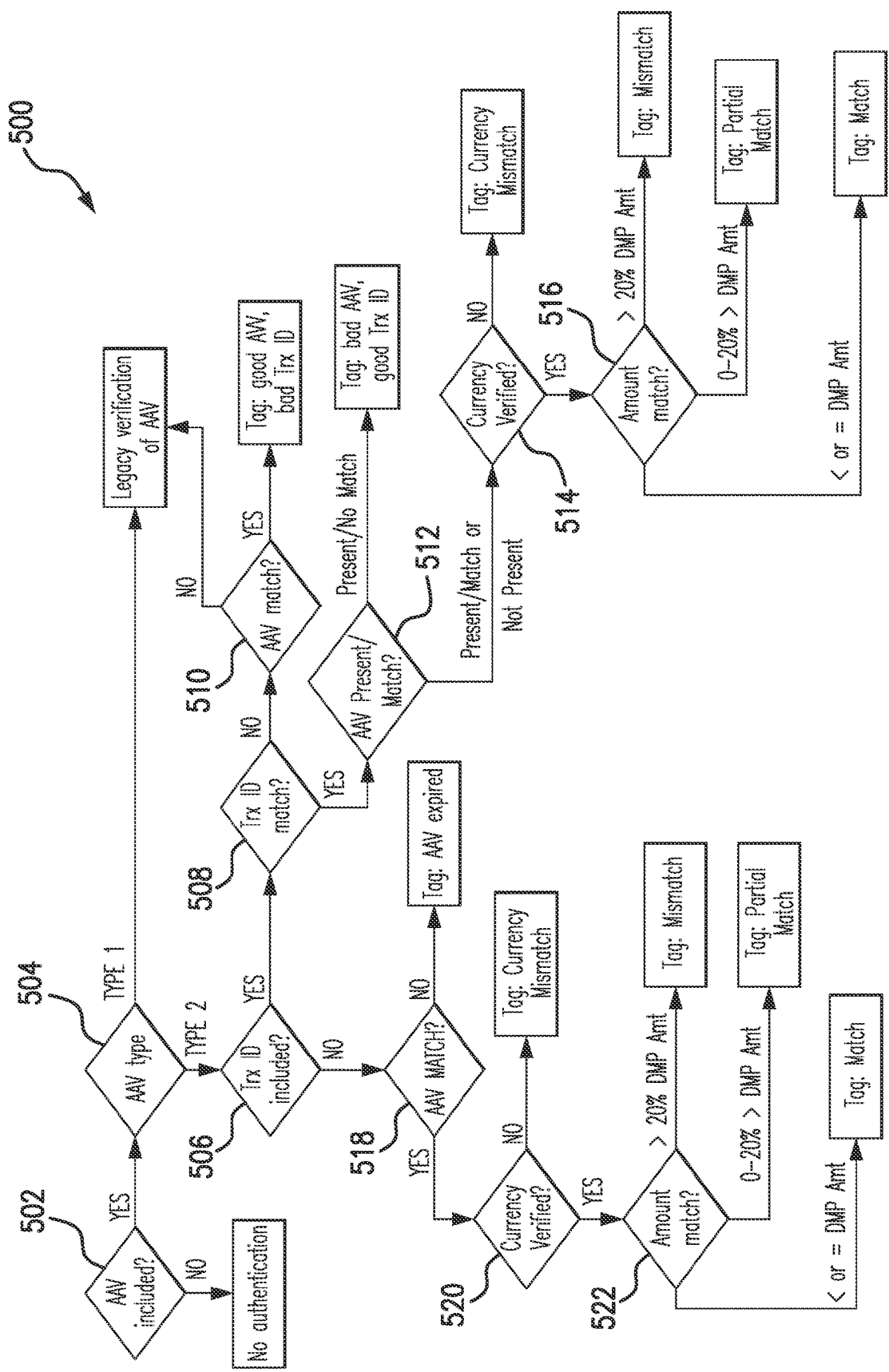

FIG. 4 illustrates an exemplary method that may be implemented via the system of FIG. 1, for enhancing an authorization request for a network interaction based on authentication of a user in accordance with the method of FIG. 3; and FIG. 5 illustrates exemplary logic that may be implemented via the system of FIG. 1, for verifying the authentication of a user as part of enhancing an authorization request for a network interaction in accordance with the method of FIG. 4.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are widely implemented by users to fund transactions for products at merchants (e.g., transactions for goods, services, etc.). To avoid issues related to fraudulent and/or unauthorized use of the payment accounts (and fraudulent transactions), issuers of the payment accounts may impose/utilize authentication and validation techniques and/or requirements for the users initiating the transactions. In connection with enhanced authentication, via the 3-D Secure™ specification, for example, the results of the authentication (of the users initiating the transactions) may not be readily linked to authorization for the transactions, whereby the authentication results may be compromised or may be ineffectively or inefficiently applied to the underlying transactions (based on the separate authentication and authorization processes).

With that said, the systems and methods herein uniquely permit matching between authentications and authorizations associated with transactions, via an authentication verification service, whereby specific authentication results for the transactions may be selectively provided to issuers in association with authorization messaging for the transactions. In particular herein, when an authentication request is received at a directory server (from merchant 3DS Server software (3DSS) associated with a merchant) for a given transaction at the merchant, the directory server generates a transaction ID, and further cooperates with an access controller server (ACS) (and/or other server associated with an issuer of a payment account used in the transaction) to compile an accountholder authentication value (AAV) for the transaction. The directory server stores, for example, the transaction ID, the AAV, a transaction amount for the transaction, and a transaction currency, for example, in a decision management platform (DMP). Thereafter, the directory server provides an authentication response to the 3DSS, and thus, to the merchant.

The merchant then compiles and transmits to a payment network an authorization request for the transaction, which includes, for example, the transaction ID, the AAV, a transaction amount, and a transaction currency. Upon receipt of the authorization request (or in response to a verification request directly from the issuer (e.g., out of network, etc.)), the payment network then makes various comparisons between details for the transaction at the DMP and details for the transaction included in the authorization request, or part thereof, and potentially, makes additional comparisons against authentication parameters (e.g., amount limits, number of authorizations, intervals, etc.), and based (at least in part) thereon defines one or more authentication verification results, which is/are provided to the issuer. The issuer, then, may rely on the message (and the authentication verification results) in connection with authorizing, or declining, the transaction. In this manner, the directory server and the payment network cooperate to permit matching between the authentication and authorization phases of the transaction, whereby the authentication verification result may provide enhanced understanding of the transaction to the issuer during authorization of the transaction in order to enhance security at the issuer and/or to implement a further action to help inhibit fraudulent transactions.

FIG. 1 illustrates an exemplary system 100 for authenticating and verifying a user 104 in connection with a transaction by the user 104 (at a merchant 102), and which is consistent with the EMV® 3-D Secure™ protocol/specification, for example. It should be appreciated, however, that not all details of the EMV® 3-D Secure™ protocol/specification are discussed herein, as such information is readily understood by those skilled in the art. In addition, the illustrated system 100 includes a plurality of entities that interact with each other by exchanging multiple, specifically formatted messages over secure communication channels (e.g., as defined in the EMV® 3-D Secure™ protocol/specification (see, e.g., https://www.emvco.com/emv-technologies/3d-secure/; etc.), etc.). Accordingly, it should be appreciated that the authentication system 100 illustrated in FIG. 1 is complex, given the number and extent of entities, messages, and other requirements necessarily involved.

As shown in FIG. 1, the system 100 includes the merchant 102, the user 104 who transacts with the merchant 102 for one or more products, and a computing device 106 associated with the user 104. The merchant 102 includes, in this exemplary embodiment, a virtual merchant having a virtual merchant location, such as, for example, a website, a network-based application, etc., which is accessible by users (e.g., the user 104, etc.), via a computing device (e.g., the computing device 106 associated with the user 104, etc.). The merchant virtual location may be managed and/or provided directly by the merchant 102, or it may be managed and/or provided by another entity on behalf of the merchant 102, etc. In general, the merchant virtual location permits the user 104 to browse and/or search among one or more products (e.g., good, services, etc.) and to select product(s) for purchase from the merchant 102.

The computing device 106 may include, for example, a tablet, a smartphone, a laptop, a desktop, or other device, which enables the user 104 to interact and/or communicate with the merchant virtual location. It should be appreciated that the computing device 106 may include several computing devices, such as, for example, a tablet and also one or more Internet-of-Things (IoT) devices located as a premises associated with the user 104 or elsewhere, etc. Exemplary IoT devices may include appliances (e.g., washing machines, coffee makers, etc.), voice activated virtual assistants (e.g., Alexa™ by Amazon, Google Home™ by Google, etc.), cameras, doorbells, security systems, etc. Regardless of the type of computing device 106, it should be appreciated that the computing device 106 includes unique identifying data, such as, for example, a media access control address, an electronic series number (ESN), a browser IP address, etc.

In this exemplary embodiment, the merchant 102 is associated with an acquirer 108 (e.g., including an acquirer computing device, etc.), in that the acquirer 108 issues an account to the merchant 102 to receive funds in connection with payment account transaction directed toward the merchant 102. Likewise, the user 104 is associated with an issuer 110, in that the issuer 110 has issued an account (e.g., a credit account, a debit account, a prepaid account, etc.) to the user 104 to fund payment account transactions directed toward the merchant 102 (and other merchants) for the purchase of one or more products. The system 100 also includes a payment network 112, which is configured to coordinate between the acquirer 108 and the issuer 110 to transfer funds, consistent with an authorization to transfer such funds through clearing and/or settlement therebetween. Authorization of a transaction between the user 104 and the merchant 102 is described in more detail below.

The system 100 as shown in FIG. 1 also implements the 3-D Secure™ specification (as part of enhanced authentication of transactions). In connection therewith, the system 100 further includes 3DS Server software (3DSS) 114 (e.g., which may be replaced with a merchant-plug-in (MPI) in some embodiments, etc.), a directory server 116, an access control server (ACS) 118, and a decision management platform (DMP) 120, which are configured to cooperate to provide enhanced authentication of the user 104 in the context of a transaction at the merchant 102, as described more below. The 3DSS 114 is associated with and/or is included in the merchant 102, and/or executed by a computing device of the merchant 102. That said, while the merchant 102 includes the 3DSS 114, it should be appreciated that the 3DSS 114 may be one or more other servers and/or services as is suitable to the particular enhanced authentication included herein, or otherwise. The ACS 118 is associated with and/or is included in the issuer 110, or on behalf of the issuer 110, for example, as defined by the 3-D Secure™ specification. And, the directory server 116 and/or the DMP 120 may be part of the payment network 112, or separate therefrom, yet coupled in communication therewith. It should be appreciated that each of the 3DSS 114, the directory server 116, the ACS 118, and the DMP 120 may be standalone computing devices, or may be integrated, in whole or in part, with one or more computing device(s) deployed at the merchant 102 (e.g., a POS terminal or backend, etc.), the issuer 110, and/or the payment network 112, etc. It should also be appreciated that the system 100 may implement other authentication specifications in other embodiments.

The parts of system 100 are coupled in communication through one or more networks, whereby messaging (e.g., requests, replies, responses, etc.), as described herein (and indicated by arrowed lines), are permitted. The network(s) may each include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts, or even combinations thereof. In one example, a network includes multiple networks, where different ones of the multiple networks are accessible to different ones of the illustrated components in FIG. 1. For instance, the payment network 112 and the DMP 120 (or the acquirer 108 and issuer 110) may be connected via a private network and, separately, the merchant 102 and the computing device 106 of the user 104 may be connected through a public network, such as the Internet.

In connection with the above, the merchant 102 and the issuer 110 (or the specific account issued to the user 104) are setup for enhanced authentication, whereby when a transaction is initiated for the payment account issued to the user 104 and/or when a transaction is initiated with the merchant 102, enhanced authentication is triggered. In this exemplary embodiment, the merchant 102 is associated with one or more particular merchant authentication parameters (applicable to transactions initiated with the merchant 102, to transactions involving the payment account at the merchant 102) (broadly, authentication parameters). The merchant authentication parameters are set or selected by the merchant 102, and define certain features and/or details of the enhanced authentication. Specifically, for example, the merchant authentication parameters may be specific to an accountholder authentication value (AAV), such as, for example, a number of days (broadly, an interval) for which the AAV and/or a corresponding transaction ID is/are valid (i.e., to be verified in the authorization), a number of times for which the AAV and/or transaction ID is valid (i.e., to be verified in the authorization), etc. The number of days may be set to, for example, five days, 10 days, 90 days, 120 days, 180 days, 365 days, or less or more, etc., while the number of times may include a discrete value or a range, such as, for example, 1-2, 3-6, or 7-12, or less or more times, etc. (e.g., as a manner of velocity check, etc.). The merchant authentication parameters may further include, for example, a transaction amount, such as a static amount or an amount included in or associated with an authentication, etc. What's more, the parameters may be employed in combination, whereby, for example, a series of authorizations may be required to be within an interval and, when the individual amounts of the authorizations are combined or aggregated, the combined amounts may also be required to be less than an authenticated amount (or amount limit), etc. It should be appreciated that the above parameters may be relevant to, for example, recurring transactions, split merchant transactions, multi-merchant transactions, etc. The merchant authentication parameters are stored, at least, in the DMP 120.

Notwithstanding the above, it should be appreciated that rather than one or more specific merchant authentication parameters (which are set and/or requested by merchants), the merchant 102 may instead (or additionally) be associated with one or more default authentication parameters (as implemented by the payment network 112 and/or the DMP 120, etc.) (again, broadly, authentication parameters). For example, an interval default parameter may indicate how long the AAV and/or the transaction ID is valid and may be imposed for all transactions (regardless of merchant) or may be imposed for certain categories of merchants (e.g., as indicated by merchant category code (MCC), etc.). The interval may be, without limitation, five days, 10 days, 90 days, 120 days, etc. Likewise, the amount included in an authentication for a transaction (or an amount based on transaction history for a payment account, etc.) may form a default parameter for transactions associated with authentications (e.g., per AAV, etc.) (e.g., all transactions with the given AAV, all transactions involving amounts less than or equal to the authentication amount parameter, etc.). It should be appreciated that still other default authentication parameters may employed by the payment network 112 and/or the DMP 120 within the scope of the present disclosure.

Regardless of the particular authentication parameters employed, the payment network 112 and/or the DMP 120 is configured to store the authentication parameters and apply the parameters, as described below.

In connection with one or more transactions, it should be understood that the user 104 has previously accessed and/or interacted with the merchant 102 at the virtual merchant location, whereby the merchant 102 includes a profile (broadly, merchant account) for the user 104, which includes payment credentials (such as a primary account number (PAN)), or potentially a token, for the user's payment account (broadly, an account identifier for the user's payment account).

For instance, with regard to use of the token, the merchant 102, or other entity on behalf of the merchant 102, may be configured to request the token from the payment network 112 (e.g., which may be embodied in and/or include a token service provider (TSP), etc.) as part of generating the profile for the user 104, for example, for later use in connection with a payment account transaction by the user 104 at the merchant 102. The payment network 112 may include, in this exemplary embodiment, the Mastercard™ Digital Enablement Service (MDES) server, but may include one or more other servers in other embodiments, etc. In any case, in response to such token request, the payment network 112 is configured to generate the token specific to the user's payment account and to map the token to an account number (e.g., the PAN, etc.) for the payment account (e.g., in a data structure associated with the payment network 112, etc.). The payment network 112 is further configured to return the token to the merchant 102, whereby the merchant 102 then is configured to store the token in association with the user's profile (or merchant account) for use by the user 104 in later transactions with the merchant 102.

As such, transactions between the user 104 and the merchant 102 may include one or more tokens as obtained in the manner described above, or the transactions may include the account number (e.g., the PAN, etc.) (broadly, an account identifier) for the user's payment account as provided by the user 104, etc. Each type of transaction is processed as described below, albeit somewhat differently depending on how it is initiated, for example, as indicated.

That said, when the user 104 browses one or more products (e.g., goods, services, etc.) at the merchant 102, via the computing device 106 and at the merchant's virtual location, the user 104 may select to purchase a product and provide an input at the computing device 106 to purchase the product, via path 122. The input, received from the user 104, may include, for example, a selection of a payment account corresponding to the token already provisioned to the merchant 102. Or, the input may include the user 104 providing a token, providing the account number (e.g., PAN, etc.) for the same payment account (for which the token has already been received or not), or an account number for a different payment account, and/or other details of the transaction.

In response to the input (and/or details provided in connection therewith), the 3DSS 114 associated with the merchant 102 is configured to compile an authentication request (AReq) for the transaction. The AReq includes, without limitation, a merchant name for the merchant 102, a location of the merchant 102, a merchant ID for the merchant 102, the payment account credential (e.g., the PAN, the token, etc.) for the user's payment account, a transaction amount, a currency of the transaction (e.g., a currency code, etc.), a unique ID associated with the computing device 106, etc. What's more, the AReq is provided/configured to include many different data elements, which may include mandatory, conditional or optional elements, for example, as defined and/or suggested by the EMV 3DS™ specification, etc. The 3DSS 114 is configured to then transmit the AReq, via path 124, to the directory server 116. Upon receipt of the AReq, the directory server 116 is configured to generate a unique directory server (DS) transaction ID for the transaction.

When the AReq includes the token provisioned to the merchant 102, the directory server 116 is configured to receive the AReq and to transmit the token, from the AReq, to the payment network 112, via path 126. The payment network 112, in turn, is configured to map the received token to the account number (e.g., the PAN, etc.) for the user's payment account and to return the account number (e.g., PAN, etc.) back to the directory server 116, again via path 126. And, the directory server 116 may append the account number to the AReq and also store the account number in the DMP 120 (via path 132). Alternatively, when the AReq includes the account number for the user's payment account (e.g., the PAN, etc.), the directory server 116 need not interact with the payment network 112 to obtain the same. In connection therewith, then, the directory server 116 may retrieve the account number from the AReq and store the same in the DMP 120.

In turn, the directory server 116 may be configured to compress certain data associated with the transaction. For example, the directory server 116 may be configured to determine a logarithm of the transaction amount (i.e., a log amount), thereby compressing data used to present the amount (e.g., a six byte value for the amount may be encoded in two bytes with a potential error of less than +/−0.02%, etc.) (although this is not required in all implementations). The directory server 116 may further be configured to then provide, for example, the AReq, with the account number and data, via path 128, to the ACS 118. The ACS 118, in turn, is configured to assess a risk of the transaction (e.g., based on the amount of the transaction, the merchant type involved, the user 104, the user's device information (e.g., a recurring device, etc.), etc.). If the risk is not acceptable (based on the above analysis/authentication), the ACS 118 may be configured to further provide a challenge question, consistent with conventional techniques, to authenticate the user 104, decline the transaction, or proceed otherwise, etc. When the user 104 is authenticated, through the above risk-based assessment, or through the additional challenge question, or otherwise, the ACS 118 is configured to then generate an issuer authentication value (IAV) based on suitable techniques and data (e.g., whereby the IAV includes four hexadecimal bytes or other suitable size/format, etc.). As such, for example, the IAV may be specific to the user 104, the merchant 102 and also the transaction (e.g., based on the log amount or the amount in general for the transaction, based on other transaction information, based on the payment account used in the transaction (e.g., the PAN for the payment account, etc.), based on combinations thereof, etc.), thereby inhibiting, generally, the IAV from being generated for one transaction and submitted in another authorization request for another transaction to the same or different merchant.

The ACS 124 is configured to then transmit the IAV to the directory server 116, again, via path 128, as an authentication response (ARes) for the transaction.

Optionally, when the ACS 124 determines to authenticate the user 104 through a challenge question, the ACS 124 may be configured to include a challenge indicator (e.g., a network address to be called by the merchant 102, etc.) in the ARes and then transmit the ARes to the directory server 116, along path 128. Here, the directory server 116 may be configured to then transmit the ARes to the merchant 102 (via the 3DSS 114, etc.), via path 124. In turn, the merchant 102, and in particular, the virtual merchant location (e.g., the website, etc.) may identify the challenge indicator and call or otherwise invoke the challenge, thereby providing interaction, via path 130, between the user's computing device 106 and the ACS 118. The interaction generally includes the presentation of a challenge question (e.g., Enter Your Personal Code, etc.), whereupon the user 104 provides a response, via path 130. And, the ACS 118 is configured to confirm the response of the user 104. Thereafter, when confirmed, the ACS 118 is configured, consistent with the above, to generate the IAV, and then generate a response including the IAV and transmit the response to the directory server 116, via path 128.

Upon receipt of the IAV from the ACS 118 (either in the AReq or otherwise), the directory server 116 is configured to generate a message authentication code (MAC) for an AAV for the transaction (i.e., data to be included in the AAV) and then to compile the AAV. The AAV includes the IAV, the amount and merchant information, and the signature information (e.g., key ID and the MAC, etc.), and other suitable information, etc. It should be appreciated that data included in the AAV may vary based on the particular implementation thereof, whereby the AAV may include more or less data, but will generally include the IAV from the ACS 118. As such, the AAV may be of different types depending on the data included in the AAV. In this exemplary embodiment, the AAV is one type of AAV, that may specifically include a Secure Payment Authentication v2 Accountholder Authentication Value (SPA2 AAV) as defined by the Mastercard™ payment network, etc. And, in connection therewith, the SPA2 AAV may generally include a leading indicator (e.g., control bytes that are 2 hexadecimal bytes, etc.), the IAV (e.g., which is 4 hexadecimal bytes, etc.), and a Mastercard™ value comprised of 13-15 hexadecimal bytes (such that the resulting SPA2 AAV, in this example, is 28 characters in base 64). Additionally, in some implementations, the SPA2 AAV may also include PAN information for the payment account used in the transaction, as well as transactional information for the transaction (e.g., the DS transaction ID, the transaction amount, etc.). In other embodiments with different directory servers (e.g., legacy directory servers, etc.), the AAV may be a different type of AAV (e.g., a legacy AAV, a Secure Payment Authentication v1 Accountholder Authentication Value (SPA1 AAV), etc.), which may include limited data, including a message authentication code key (MAC key). For instance, when the AAV is a SPA1 AAV, the SPA1 AAV may include (without limitation) a bank identification number (BIN) for the payment account used in the transaction as well as merchant and ACS configuration and key management data. The directory server 116 is further configured to store the AAV (when the AAV is the SPA2 AAV), along with the account number for the transaction (as mapped from the token, or not), the DS transaction ID, the transaction amount, and the transaction currency, in the DMP 120 (via path 132).

Thereafter, the directory server 116 is configured to provide the AAV, along with the DS transaction ID (in this exemplary embodiment), to the 3DSS 114, again via path 124. In addition, the directory server 116 is configured to provide the account number, the AAV, the DS transaction ID, the transaction amount, and the transaction currency to the DMP 120, via path 132, whereupon the DMP 120 is configured to store the data in memory, in, for example, a rapid access memory, etc.

In turn, the merchant 102 is configured to compile an authorization request for the transaction, which includes the token or the account number for the user's payment account (broadly, an account identifier for the user's account), as appropriate, and also the AAV. In this exemplary embodiment, the merchant 102 is configured to further include the DS transaction ID, the amount of the transaction and a currency of the transaction in the authorization request. In particular, for example, the merchant 102 includes the account number (e.g., the PAN, etc.) at data element (DE) 2 of the authorization request, in accordance with the ISO-standard format, the AAV in DE 48, sub-element (SE) 48, the DS transaction ID in DE 48, SE 66 (sfa2), the purchase amount in DE 4 (or the purchase amount exponent), and the currency code for the transaction in DE 49, etc. It should, of course, be appreciated that the data included in the authorization request may be included at different data elements within the message, whether according to the ISO-standard format, or not. It should also be appreciated that the transaction amount, for example, may be included in the authorization request and also compiled into the AAV, whereby it is accessible from the authorization request without processing or "unpacking" the transaction amount from the AAV.

Once compiled, the merchant 102 is configured to then transmit the authorization request to the acquirer 108, via path 134. The acquirer 132, in turn, is configured to transmit the authorization request to the payment network 112, via path 138.

Upon receipt of the authorization request, the payment network 112, and/or more specifically, the DMP 120 in communication with the payment network 112, may be configured to perform an authentication verification on the transaction, whereby the prior authentication for the transaction is identified to and/or matched with the authorization (when such prior authentication is completed for the transaction). In connection therewith, the DMP 120 is configured to execute one or more rules, which define a tag or authentication verification response or result indicative of the verification. The tag, for example, may include a code or identifier of the specific result, such as, for example "05M" where the "05" is indicative of application of the authentication verification services and the "M" is indicative of a currency mismatch. Other tags are explained in more detail below. And, the payment network 112 is configured to append the authentication verification response/result to the authorization request and then provide the modified authorization request to the issuer 110. In this manner, the issuer 110 is informed of the details of association between the authentication of the user 104 (if any) and the authorization being sought by the merchant 102 (e.g., based on the appended tag(s), etc.). And, the issuer 110 may then utilize the appended authorization verification response/result as part of determining whether to approve or decline a given transaction.

In particular, in performing the authentication verification, the payment network 112 is configured to initially interact with the DMP 120, via path 136. In doing so, the payment network 112 (or potentially, the DMP 120) is configured to determine whether the AAV is included in the authorization request (and is within a reasonable interval from the authentication (e.g., within 10 days, etc.) (e.g., as defined by a specific merchant authentication parameter or a default authentication parameter, etc.) and whether the AAV is a first type of AAV (e.g., a legacy version of the AAV (e.g., a Secure Payment Authentication v1 Accountholder Authentication Value (SPA1 AAV), etc.), etc.) or a second type of AAV (e.g., an enhanced version of the AAV (e.g., the SPA2 AAV, etc.), etc.), which includes different information. In response to no AAV being included in the authorization request, the payment network 112 is configured to append a tag to the authorization request indicating the same.

Alternatively, in response to the AAV being included in the authorization request, and AAV being the first type of AAV, the payment network 112 is configured to append a tag to the authorization request indicating the authentication value is included, whereby the result is honored by the payment network 112. However, when the AAV is the second type of AAV, the payment network 112 is configured to determine whether the DS transaction ID is included in the authorization request. In response to the DS transaction ID being included, the payment network 112 is configured to search for the DS transaction ID in memory of the DMP 120. If no match is found in the DMP 120 (for the DS transaction ID), the payment network 112 is further configured to search in the DMP 120 for the AAV from the authorization request. If the AAV is found, the payment network 112 is configured to append a tag (e.g., a value, etc.) to the authorization request indicating a good AAV, but a bad DS transaction ID. In some embodiments, when the AAV is found, the payment network 112 may also be configured to determine if the AAV is valid or expired (however, the AAV will generally be removed from the DMP 120 if it is expired, such that an expired AAV will not be found). Alternatively, when the AAV is not found (or is determined to be expired), the payment network 112 is configured to determine that an issue exists and to append a tag to the authorization request indicating the same.

It should be understood that, for example, when a tag is appended to the authorization request, the tag may be included in a data element (DE), and sub element (SE) therein, of the authorization request (where the authorization request may be consistent with an ISO-standard message). In this exemplary embodiment, then, the tag may include the "05" value in the ISO-standard message, for example, at DE48 (Additional Data-Private Use) at sub element 71 (On-behalf Services), at subfield 1 (On-behalf Service), which is indicative of the Identity Check AAV Verification Service, and then at Subfield 2 (On-behalf Result), which includes a value that gives fulfilled and unfulfilled detail of the authentication verification result. For example, a tag or code of "D" may be included when the transaction ID failed, or otherwise, as described below. It should be appreciated that such tags or codes (and the particular data elements, etc. of the tags in the authorization request) are provided herein for purposes of illustration only, as any suitable tags may be included to inform the issuer 110, for example, of the result of the authentication verification service.

In connection with the above, when the DS transaction ID is found in the DMP 120, the payment network 112 is also configured to search for the AAV in the DMP 120. If the AAV is not found or is found, but it is not included with the identified DS transaction ID, the payment network 112 is configured to append a tag (e.g., a value, etc.) to the authorization request indicating a bad AAV, but a good DS transaction ID. For example, a tag of "I" may be included for indicating an invalid AAV, or otherwise, as described below. Or, a combination of tags may be used (e.g., "KDI" where there is no matching key file for as PAN ("K"), the transaction ID failed ("D"), and the AAV is invalid ("I"); etc.). The payment network 112 may also be configured to determine whether the currency included in the authorization request matches the currency in the DMP 120 associated with the DS transaction ID (and the AAV when found). When there is no match, the payment network 112 is configured to append a tag to the authorization request indicating a currency mismatch. However, when there is a match, the payment network 112 is configured to then compare transaction amounts from the authorization request and the DMP 120 and append a tag to the authorization request indicating a result of the comparison of the two transaction amounts: a match (the transaction amount in the authorization request is < or = the amount in the DMP 120), a partial match (the transaction amount in the authorization request is between 0%-20%> than the amount in DMP 120), or a mismatch (the transaction amount in the authorization request is >20% over the amount in DMP 120), etc. It should be appreciated that other thresholds of percentages or ranges of percentages (e.g., 10%, 15%, etc.) may be employed by the payment network 112 to inform to issuer 110 of the relative amount of the transaction.

Further in the authentication verification, when the DS transaction ID is not included in the authorization request, the payment network 112 is configured to determine whether there is a match for the AAV from the authorization request in the DMP 120. In response to no match, the payment network 112 is configured to append a tag to the authorization request indicating a bad AAV, and a bad DS transaction ID (e.g., an expired AAV whereby the expired AAV was removed from the DMP 120 and therefore not found, etc.), etc. Alternatively, when the AAV is found in the DMP 120, the payment network 112 is configured to determine whether the currency of the authorization request matches the currency in the DMP 120 associated with the AAV. If there is no match, the payment network 112 is configured to append a tag to the authorization request indicating a mismatched currency. But when there is a match, the payment network 112 is configured to append a tag to the authorization request indicating results of the comparison of the two transaction amounts: a match the transaction amount in the authorization request is < or = the amount in the DMP 120), a partial match (the transaction amount in the authorization request is between 0%-20%> than the amount in DMP 120), or a mismatch the transaction amount in the authorization request is >20% over the amount in DMP 120), etc.

It should be appreciated that identifying the AAV in the authorization request and searching for the AAV is permitted without unpacking content of the AAV. For example, encryption, compression or truncation of the data included in the AAV need not be performed by the DMP 120. But rather, the AAV itself, without processing, may be compared and/or matched to data in the DMP 120, as described above, to provide enhanced efficiency in matching the AAV (and, by extension, a prior authentication, if completed, to the instant transaction for which the authorization request is provided).

In connection with the above, as part of one or more embodiments, the DMP 120 may be further configured to impose one or more default authentication parameters or merchant authentication parameters on the transaction and/or authorization request (as generally described above) (broadly, authentication parameters), as part of authentication verification. Specifically, for example, as each authorization request is subjected to the authentication verification service, the DMP 120 may be configured to count the number of authorization requests that include the AAV and/or the DS transaction ID (or decrement a permitted count, etc.), to determine a lapsed time from the authentication of the user 104, and to aggregate the amount of the current transaction with prior transaction amounts, if any, etc. In connection therewith, the DMP 120 is further configured to compare the count, the lapsed time, and the amount or aggregated amount relative to the merchant authentication parameters (or default authentication parameters) for the merchant 102 (or for the user's payment account). In response to the authentication parameters being satisfied, the DMP 120 is configured to interact with the payment network 112, to append a tag to the authorization request indicating that the transaction satisfies the authentication parameters, thereby permitting the transaction to proceed (e.g., with the tag(s) appended to the authorization request), etc. Conversely, in response to the authorization request violating one or more authentication parameters, the DMP 120 is configured to interact with the payment network 112, to append a tag to the authorization request indicating that the transaction violates the authentication parameters (potentially, with an indication of which of the parameters is violated).

Thereafter, and potentially, subject to the merchant authentication parameters being satisfied, the payment network 112 is configured to provide the authorization request (including the account number and the appended tag(s)) to the issuer 110, along path 140. In addition, depending on the result of the authentication verification, the payment network 112 may be configured to impose one or more services (e.g., value added services, spend controls, decision intelligence (e.g., based on issuer or user rules, instructions, input, etc.), token management, installments, rewards programs, in-flight transaction blocking, PIN management, etc.) for the transaction.

With continued reference to FIG. 1, the issuer 110 is configured to determine (upon receipt of the authorization request from the payment network 112) whether the transaction should be approved or declined, and to respond accordingly, through the payment network 112. It should be appreciated that when the issuer 110 approves the transaction, based on the prior authentication (e.g., the AAV, etc.), the issuer 110 assumes the liability of the authorization as the issuer 110 has concluded that the user 104 (i.e., as an authorized user) has initiated the transaction whereby a chargeback right is waived or forgone. As such, to take into account the prior authentication, the issuer 110 is configured to pull apart the AAV (when the AAV is the second type of AAV) and to validate the IAV from the AAV based on one or more shared key(s) with the ACS 118. The IAV, more specifically, may be validated in the same manner it was generated above, for example, based on a secret key, cryptographic techniques, etc. used by the ACS 118, and the account number or other data, etc. The issuer 110 is further configured to rely on a tag included in the authorization request, when appended by the payment network 112, in connection with authorizing the transaction (or not). What's more, the issuer 110 may be configured to validate the transaction amount (i.e., the amount indicated in the authorization request) based on the log amount from the AAV (or, optionally, the uncompressed amount), or other data included in the AAV, etc. Once a determination is made, the issuer 110 is configured to transmit an authorization response (including the user's account number) back to the payment network 112, along path 140. In turn, the payment network 112 is configured to route the authorization response back to the acquirer 108, via path 138. The acquirer 108, in turn, is configured to provide the authorization response back to the merchant 102, directly or via the 3DSS 114, along path 134. At this point, the transaction is approved (in this example) and the merchant 102 may direct the selected product to be delivered to the user 104.

In the above description, the payment network 112 directly, and by virtue of the directory server 116 and the DMP 120, participates in both the authentication and the authorization for the transaction. In one or more embodiments, the authorization may be initiated through an alternate payment network, whereby the directory server 116 and/or the DMP 120 may be configured to respond to an authentication verification request from the issuer 110, for example (rather than upon receipt of an authorization request from an acquirer (e.g., the acquirer 108, etc.)). In particular, when an authorization request is received from an alternate payment network (e.g., coupled between the acquirer 108 and the issuer 110, but different and distinct from the payment network 112, etc.) (e.g., involving different authorization switches, etc.) (e.g., off network, etc.), the issuer 110 is configured to submit a request for authentication verification (broadly, a service request) to the payment network 112. The service request may be provided in the form of an application programing interface (API) request or a ISO formatted message (e.g., an ISO-8583 format that can be handled/processed by the payment rails of the payment network 112, etc.) (e.g., a single message, a dual message, a host international organization for standardization (HISO) message, a shared services platform (SSP) message (e.g., which may use an ISO 0100/0110 message with an added header and trailer that caries identity and requested service information, etc.), etc.) (or otherwise formatted message) to an interface processor of the payment network 112 (e.g., a Mastercard Interface Processor (MIP), etc.).

Stated another way, in this exemplary embodiment, for such a service request, the request is received directly from the issuer 110 for additional details in connection with the issuer's decision related to authorization, rather than from the acquirer associated with the merchant 102, in connection with passing an authorization request to the issuer 110. The request is provided to the payment network 112, as a request for direct service access (DSA) (e.g., as an off-network feature for providing services for transactions, etc.), whereby the issuer 110 provides a specific request for a specific service, which may be otherwise performed by the payment network 112 for routine authorization requests transmitted through the payment network 112, for example. The request includes, without limitation, the authorization request, or potentially, the DS transaction ID, the AAV, the transaction amount and/or the transaction currency, etc. from the authorization request, or more or less data, etc. In connection therewith, DSA as described above may permit the issuer 110 to gain access to additional services provided by the payment network 112 for the transaction (e.g., fraud scoring, spend controls, etc.), despite a part of the transaction being processed by and/or through the alternate payment network. DSA also permits and/or supports multiple different service request formats. As such, in making the service request, the issuer 110 can provide the request in any suitable format including, for example, one consistent with forwarding an authorization message for the transaction received by the issuer 110 from the alternate payment network, etc., without having to reformat the message to accommodate the payment network 112. Further, through DSA, the payment network 112 may select appropriate services to apply to the transaction based on a profile for the issuer 110 (or other predefined parameters relating to the transaction), instead of the issuer 110 having to specify the desired service (as is required in other prior implementations). What's more, through DSA, the one service request may encompass or invoke multiple different services for the one transaction, instead of requiring a separate service request for each desired service (as is required in other prior implementations).

In response to such a service request, the payment network 112 is configured to, as described above, cooperate with the DMP 120, to perform an authentication verification, whereby the prior authentication is identified to the instant authorization, and to respond with a result of the authentication verification. The result may include, for example, any of the tags described above depending on the AAV being present and being of a certain type, on a matching DS transaction ID and/or AAV, on a matching currency and/or matching transaction amount, etc.

Figure 2:
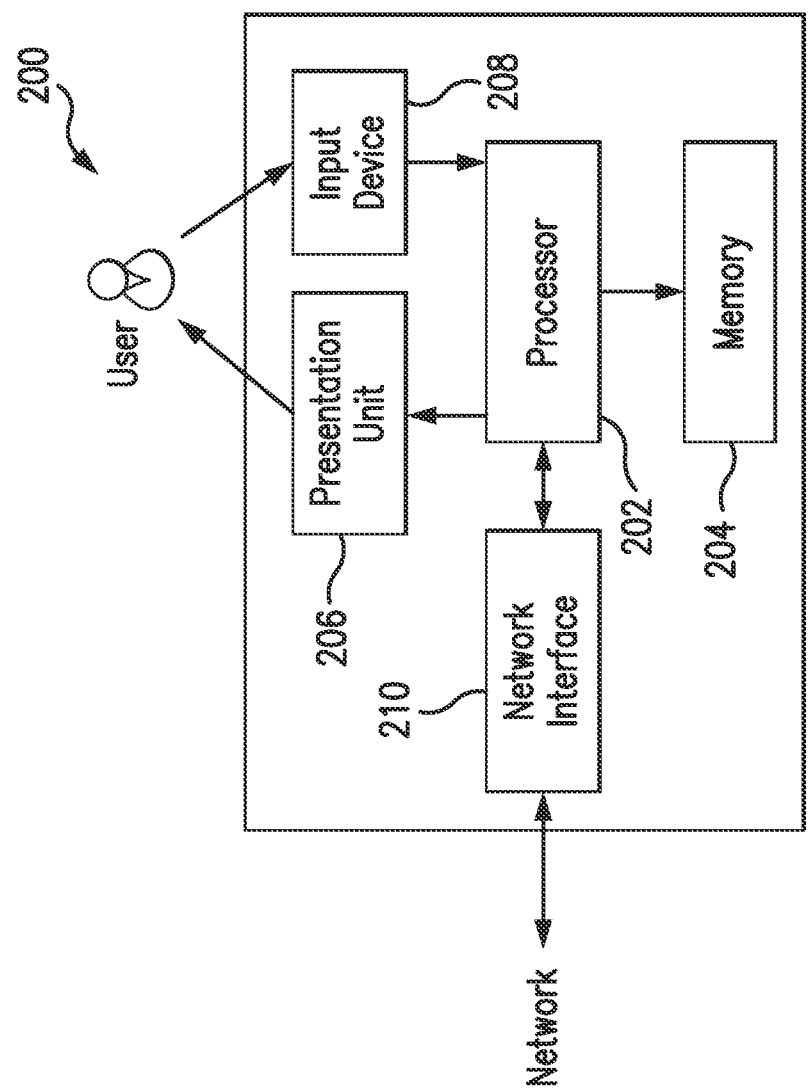
FIG. 2 is a block diagram of an exemplary computing device that may be used in the system of FIG. 1.

It should be appreciated that each of the merchant 102, the computing device 106, the acquirer 108, the issuer 110, the payment network 112, the 3DSS 114, the directory server 116, the ACS 118, and the DMP 120, etc., are implemented herein in one or more computing devices, such as computing device 200 illustrated in FIG. 2. In connection therewith, the one or more computing devices are each in communication with one or more other entities via at least one of the networks described herein. In general, each of the paths included in FIG. 1, along which, or via which, messages are exchanged in the above description, are representative of the network(s).

FIG. 2 illustrates exemplary computing device 200, which may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In at least one embodiment, the computing device 200 is accessed (for use as described herein) as a cloud, fog and/or mist type computing device. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permits data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, IAVs, AAVs, authentication requests, tags, DS transaction IDs, transaction amounts, transaction currency codes, account numbers (e.g., PANs, etc.), and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein, and may effectively transform the computing device 200 into a special purpose computing device. It should be appreciated that the memory 204 may include a variety of different memories, each implemented in one or more of the functions or processes described herein.

In the exemplary embodiment, the computing device 200 also includes a presentation unit 206 that is coupled to the processor 202 (however, it should be appreciated that the computing device 200 could include output devices other than the presentation unit 206, etc.). The presentation unit 206 outputs information (e.g., confirmations of purchases, challenge questions, etc.), either visually or audibly to the user 104 or other information to other users associated with any of the entities illustrated in FIG. 1, at a respective computing device, etc. It should be further appreciated that various interfaces may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

In addition, the computing device 200 includes an input device 208 that receives inputs from users (i.e., user inputs) such as, for example, responses to challenge questions, checkout inputs, payment account credentials, etc., from the user 104 or other information from other users in the system, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks and/or one or more other computing devices herein.

FIG. 3 illustrates an exemplary method 300 for use in authenticating users in connection with network interactions. The exemplary method 300 is described (with reference to FIG. 1) as generally implemented in the 3DSS 114, the directory server 116 and the DMP 120, and more generally, in the system 100, and with further reference to the computing device 200. As should be appreciated, however, the methods herein should not be understood to be limited to the exemplary system 100 or the exemplary computing device 200, and the systems and the computing devices herein should not be understood to be limited to the exemplary method 300.

In the illustrated method 300, for a transaction initiated by the user 104 with the merchant 102, the 3DSS 114 receives an authentication instruction from the merchant 102, at 302. The instruction includes the details of the transaction, such as, for example, the payment account number (or token) for the account used in the transaction, the transaction amount, a device ID for the computing device 106 (at which the transaction is initiated between the user 104 and the merchant 102), a merchant name for the merchant 102, a currency code indicative of a currency of the transaction (e.g., U.S. dollars, Euros, etc.), merchant location data (e.g., a country code, etc.), etc. Next, the 3DSS 114 compiles, at 304, an authentication request (AReq), which includes the details of the transaction including, for example, the payment account number (or token), the device ID, the transaction amount, the transaction currency, etc. The 3DSS 114 further transmits, at 306, the AReq to the directory server 116.

The directory server 116 receives the AReq and generates, at 308, a transaction ID for the transaction (the "DS transaction ID"). In addition, in instances when the AReq includes the token for the user's account, rather than the account number, the directory server 116 further communicates with the payment network 112 to identify the account number associated with the token (as described above in connection with the system 100). And, once the account number is obtained from the payment network 112, the directory server 116 includes the account number in the AReq (e.g., updates or modifies the AReq to include the account number, etc.). The AReq is then transmitted, with the account number, by the directory server 116, at 310, to the ACS 118.

In response, the ACS 118 determines to accept the risk of the transaction, and specifically, generates, at 312, an IAV for the transaction, which includes, for example, a transaction amount, a merchant ID, and a currency code for the transaction, etc. (based on data included in the AReq). In doing so, for example, the ACS 118 may perform a risk-based assessment of the transaction, whereby the ACS 118 will generally determine to authenticate or not authenticate the user 104. The assessment may be based on the merchant data (e.g., MCC, merchant location, merchant type, etc.), the transaction data (e.g., transaction amount, currency, etc.), and the user data (e.g., user location, device ID, etc.), etc. provided in the ARes. Optionally, as part of the assessment, as is conventional, the ACS 118 may use the directory server 116 to initiate a challenge question with the user 104, when the risk-based assessment deems additional authentication data is necessary, whereby the user 104 is authenticated through additional interaction with the ACS 118 (as described above in the system 100). Then, once the user 104 is authenticated, regardless of whether by the risk-based assessment alone, the challenge question, a combination thereof, or otherwise, the ACS 118 generates the IAV for the transaction. In general, the IAV will contain four bytes of value comprising a cryptographically generated value. That said, it should be appreciated that other cryptographic techniques may be employed to generate the IAV in other embodiments. In turn, the ACS 118 transmits the IAV to the directory server 116, at 314 (whereby the directory server 116 receives the IAV).

In response, the directory server 116 compiles, at 316, the AAV. In this embodiment, the AAV is compiled as a SPA2 AAV, but may be compiled as (or consistent with) other types of AAVs in other embodiments (e.g., a SPA1 AAV, etc.). The SPA2 AAV, for example, may then include, again, three parts: a leading indicator (or control byte (e.g., two hexadecimal bytes, etc.) (which is indicative of the type of the AAV)), the IAV received from the ACS 118 (or other data when no IAV is provided) (e.g., four hexadecimal bytes, etc.), and payment network specific data (e.g., 13-15 hexadecimal bytes, etc.), thereby providing the AAV with twenty-eight characters in base 64. In other embodiments, where the directory server 116 compiles the AAV (at 316) as a SPA1 AAV, the SPA1 AAV may include other data, but generally, still includes the leading indicator and the IAV along with a MAC key specific to the issuer 110, etc. It should be appreciated that still other types of AAVs may be compiled by the directory server 116, or otherwise, as evidence and/or indication of the authentication of the user 104, etc.

The directory server 116 further stores the compiled AAV, the transaction ID, the transaction amount and the currency of the transaction (e.g., as indicated by a currency code) in the DMP 120, at 318, in memory thereof (e.g., the memory 204, etc.). The directory server 116 also transmits, at 320, the AAV to the merchant 102 (via, or as part of, the ARes), and specifically, to the 3DSS 114 for subsequent use in authorization of the transaction.

Conversely, if authentication of the user 104 at the ACS 118 fails, the ACS 118 communicates an authentication failure to the directory server 116 (or, potentially, responds otherwise, as prescribed by the issuer 110, for example). The failure, in turn, is passed to the 3DSS 114 and the merchant 102 (e.g., via the ARes, etc.) (whereby the merchant 102 may halt or decline the transaction, etc.).

FIG. 4 illustrates an exemplary method 400 for enhancing an authorization request for a transaction, in connection with a network interaction between a user and a merchant, based on authentication of the user in accordance with the method 300 of FIG. 3. The exemplary method 400 is described (with reference to FIG. 1) as generally implemented in the merchant 102, the issuer 110, the payment network 112, and the DMP 120, and more generally, in the system 100, and with further reference to the computing device 200. As should be appreciated, however, the methods herein should not be understood to be limited to the exemplary system 100 or the exemplary computing device 200. And, similarly, the systems and the computing devices herein should not be understood to be limited to the exemplary method 400.

It should be appreciated that the method 400 is generally linked to the method 300, whereby the method 400 includes enhancing an authorization request for a transaction, or at least one potential for enhancing the authorization request, following authentication of the user 104 by way of the method 300, or other method embodiments associated with authentication of users.

That said, when the merchant 102 receives a response (i.e., an ARes including an AAV) to a request for authentication of the user 104 in connection with a transaction by the user 104 at the merchant 102, via the 3DSS 114, from the directory server 116, the merchant 102 proceeds to authorize the transaction. In connection therewith, the merchant 102 compiles an authorization request, at 402. In this exemplary embodiment, the authorization request includes an ISO-8583 standard message, which includes various data elements (DEs). The data elements include (or are populated with), for example, the account number for the user's payment account (or the token therefore), the merchant ID for the merchant 102, the transaction amount, etc. In particular, in this exemplary embodiment, the merchant 102 includes the account number at DE 2 of the authorization request, the AAV in DE 48, SE 48, the DE transaction ID in DE 48, SE 66 (sfa2), the purchase amount in DE 4 (or the purchase amount exponent), and the currency code for the transaction in DE 49, etc. It should be appreciated, though, that this data, or other suitable data, may be included in different data elements of the authorization request in other method embodiments, and/or that additional (or less) data may be included in the authorization request.

The merchant 102 then transmits, at 404, the authorization request to the acquirer 108. And, in turn, the acquirer 108 transmits, at 406, the authorization request to the payment network 112.

Upon receipt of the authorization request, the payment network 112 perform authentication validation for the transaction. In connection therewith, the payment network 112 cooperates with the DMP 120, at 408, to apply exemplary logic 500 (FIG. 5) (or method flow) to evaluate the authentication request (and enhance the request as appropriate). It should be appreciated that the exemplary logic 500 may be performed by the payment network 112 or the DMP 120, or a combination thereof. For purposes of the description herein, the DMP 120 performs the exemplary logic 500, upon receipt from the payment network 112 of the AAV, the DS transaction ID, the transaction amount, the transaction currency, etc. (from the authorization request), as part of a request to perform the authentication validation (broadly, as part of an authentication verification service).

With reference to FIG. 5, the DMP 120 initially determines, at 502, whether an AAV value is included in the authorization request (as received from the payment network 112). In doing so, the DMP 120 (or the payment network 112) determines whether a value is included in the Universal Cardholder Authentication Field or UCAF of the authorization request from the acquirer 108 (as an indicator of the AAV). When not present, the DMP 120 returns to the method 400, with a determination of no authentication for the transaction (as no AAV is present). Alternately, when the AAV is present (in the UCAF), the DMP 120 determines, at 504, a type of the AAV, for example, as a first type (Type 1) (e.g., a conventional AAV or SPA1 AAV, etc.), a second type (Type 2) (e.g., a SPA2 AAV, etc.), etc. For example, the DMP 120 may identify the leading byte of the AAV (e.g., a control byte, etc.) (or another specific part of the AAV), and then use the leading byte to identify the type of the AAV (e.g., where a leading byte of "j" or "h" may be indicative of the first type of AAV and a leading byte of "k" may be indicative of the second type of AAV, etc.). What's more, in some embodiments, upon identifying the AAV type (and that an AAV is actually present), the DMP 120 may also determine if the AAV is valid or not (e.g., expired or not, etc.).

When the DMP 120 determines the AAV is the first type (e.g., a legacy AAV or SPA1 AAV, etc.), which is not intended to be matched in the logic 500 of FIG. 5, as described below, the DMP 120 relies on legacy verification of the AAV. For example, the AAV may be verified based on presence of a MAC key, shared from the issuer 110, being in a specific location in the AAV and having a specific value, etc. Then, when the DMP 120 is able to verify the AAV, based on the MAC key, the DMP 120 appends a tag to the authorization request indicative of the AAV being valid (e.g., as indicated by a code "V", etc.). Alternatively, when the DMP 120 is not able to verify the AAV, based on the MAC key, the DMP appends a tag to the authorization request indicative of the AAV being invalid (e.g., as indicated by a code "I", etc.).

When the DMP 120 determines the AAV is the second type (e.g., a SPA2 AAV, etc.), the DMP 120 determine, at 506, whether a transaction ID (e.g., a DS transaction ID as generated by the directory server 116, etc.) is included in the authorization request. When the transaction ID is included, the DMP 120 then determines, at 508, whether the transaction ID matches a transaction ID included in memory (e.g., memory 204, etc.) of the DMP 120. If the transaction ID is not found/included in the memory, the DMP 120 determines, at 510, whether the AAV from the authorization request is included in the memory of the DMP 120. When the AAV is included in the memory, the DMP 120 appends a tag to the authorization request, which indicates (in one form or another) a good AAV, bad transaction ID (e.g., as indicated by a code "D", etc.). Conversely, when the AAV is not included in the memory, the DMP 120, as above, relies on the legacy verification of the AAV, for example, based on a MAC key shared from the issuer 110 being in a specific location in the AAV and having a specific value, etc. Here, again, the DMP 120 then appends a tag indicative of the AAV being valid (e.g., as indicated by a code "V", etc.) or invalid (e.g., as indicated by a code "I", etc.), as appropriate (e.g., based on the legacy verification, etc.).

However, when the DMP 120 determines, at 508, that the transaction ID is included in the memory, the DMP 120 then determines, at 512, whether the AAV from the authorization request is included in the DMP 120 and whether the AAV is matched to the transaction ID included in the authorization request. If the AAV is included in the memory of the DMP 120, but not in a match to the transaction ID, the DMP 120 appends a tag to the authorization request indicating a bad AAV, good transaction ID.

And, when the AAV is not included, at 512, or the AAV is included and the transaction ID matches, the DMP 120 determines, at 514, whether the currency included in the authorization request (e.g., currency code, etc.) matches the currency in the DMP 120 associated with the transaction ID (and the AAV). If the currency is not a match, the DMP 120 appends a tag (e.g., a code "M", etc.) to the authorization request indicating a currency mismatch. But if the currency is a match, the DMP 120 then determines, at 516, in this example, whether the transaction amount in the authorization request matches the transaction amount in the DMP 120 associated with the transaction ID (and the AAV). In connection therewith, the DMP 120 may append a tag to the authorization request indicating a match or degree of match of the amounts: a match (the transaction amount in the authorization request is < or = the amount in the DMP 120) (e.g., where the match amount tag may include a code "V", etc.), a partial match (the transaction amount in the authorization request is between 0%-20%> than the amount in DMP 120) (e.g., where the partial match amount tag may include a code "S", etc.), or a mismatch (the transaction amount in the authorization request is >20% over the amount in DMP 120) (e.g., where the mismatch amount tag may include a code "T", etc.), etc.

In other examples, in place of determining (at 516) whether the transaction amount in the authorization request matches the transaction amount in the DMP 120 associated with the transaction ID (and the AAV) (or in addition thereto), the DMP 120 may decrement the transaction amount from a permitted amount (or from an available aggregate amount limit, for example, for a given interval, etc.). If the resulting permitted amount is zero or greater, the DMP 120 may then append a tag to the authorization request indicating the same (and, potentially, also include a remaining amount associated with the aggregate amount limit taking into account the decreased amount thereof for the instant transaction amount). However, if the resulting permitted amount is less than zero (following decrement by the instant transaction amount), the DMP 120 may append a tag to the authorization request indicating that the transaction amount exceeds the permitted amount (or remaining permitted amount).

With continued reference to FIG. 5, when the transaction ID is not included, at 506, in the authorization request, the DMP 120 determines, at 518, whether the AAV from the authorization request is included in the memory of the DMP 120. When not included in the memory, the DMP 120 appends a tag to the authorization request indicating that the AAV is expired (whereby the AAV has been or is removed from the DMP 120), or that no transaction ID or AAV match was found. Conversely, when the AAV is included in the memory, like above, the DMP 120 determines, at 520, whether the currency included in the authorization request (e.g., currency code, etc.) matches the currency in the DMP 120 associated with the transaction ID (and the AAV). When the currency is not a match, the DMP 120 appends a tag (e.g., the code "M", etc.) to the authorization request indicating a currency mismatch. And, when the currency is a match, the DMP 120 determines, at 522, whether the transaction amount in the authorization request matches the transaction amount in the DMP 120 associated with the transaction ID (and the AAV). In connection therewith, the DMP 120 may again append a tag to the authorization request indicating a match or degree of match of the amounts: a match (the transaction amount in the authorization request is < or = the amount in the DMP 120) (e.g., where the match amount tag may include a code "A", etc.), a partial match (the transaction amount in the authorization request is between 0%-20%> than the amount in DMP 120) (e.g., where the partial match amount tag may include a code "B", etc.), or a mismatch (the transaction amount in the authorization request is >20% over the amount in DMP 120) (e.g., where the mismatch amount tag may include a code "C", etc.), etc.

Again, in other examples, in place of determining (at 522) whether the transaction amount in the authorization request matches the transaction amount in the DMP 120 associated with the transaction ID (and the AAV) (or in addition thereto), the DMP 120 may decrement the transaction amount from a permitted amount (or from an available aggregate amount limit, for example, for a given interval, etc.). If the resulting permitted amount is zero or greater, the DMP 120 may then append a tag to the authorization request indicating the same (and, potentially, also include a remaining amount associated with the aggregate amount limit taking into account the decreased amount thereof for the instant transaction amount). However, if the resulting permitted amount is less than zero (following decrement by the instant transaction amount), the DMP 120 may append a tag to the authorization request indicating that the transaction amount exceeds the permitted amount (or remaining permitted amount).

Table 1 illustrates example tags that may be applied to an authorization request, as per the conditions described above and illustrated in the example logic 500 of FIG. 5. In connection therewith, in this example, each tag begins with an "05" indicating that it is associated with the authentication verification service described herein. A particular letter/code is then provided in the third spot (following the "05"), indicative of the associated condition of the authentication as understood by the issuer 110, when received in the authorization request (e.g., such as M, A, B, C, D, etc.).

TABLE 1

| | Condition | | Tag/Action |
|---|---|---|---|
| | No AAV | | Authorization request downgraded to non-authentication, and no liability shift. |
| SPA1 AAV | Legacy MAC key index check: Valid | | 05V |
| | Legacy MAC key index check: Invalid | | 05I |
| SPA2 AAV: DS Txn ID provided and found | SPA2 AAV found (with currency match) | < or = DMP amount | 05V (amount match) |
| | | 0-20% DMP amount | 05S (amount partial match) |
| | | >20% DMP amount | 05T (amount mismatch) |
| | SPA2 AAV not found | | 05I (invalid AAV response); perform legacy MAC key index check |
| SPA2 AAV: DS Txn ID provided and not found, and SPA2 AAV not found | | | Legacy MAC key index check (either valid (05V) or invalid (05I)) |
| SPA2 AAV: DS Txn ID provided and not found, and SPA2 AAV found | | | 05D (bad DS Transaction ID) |
| SPA2 AAV: DS Txn ID not | SPA2 AAV not found | | 05I (invalid AAV response) |
| | SPA2 AAV | < or = DMP | 05A |

TABLE 1-continued

| Condition | | | Tag/Action |
|---|---|---|---|
| provided | found (with currency match) | amount 0-20% DMP amount | 05B |
| | | >20% DMP amount | 05C |
| SPA2 AAV: Currency does not match during transaction amount check (DS Txn ID provided and found, SPA2 AAV found; or DS Txn ID not provided, SPA2 AAV found) | | | 05M (currency mismatch) |

Referring again to FIG. 4, when the tag is appended, or the authorization request is otherwise notated, if applicable, the payment network 112, optionally (as indicated by the dotted box), applies, at 410, the authentication parameters to the transaction associated with the AAV (e.g., merchant authentication parameters, default authentication parameters, combinations thereof, etc.). It should be appreciated that the authentication parameters may be employed in combination with the logic 500 illustrated in FIG. 5, or parts thereof, or apart therefrom. Specifically, for example (and as indicated above), one or more of the authentication parameters may be employed in lieu of the determinations made at 516 and/or 522 related to transaction amounts. In doing so, the authentication parameters may then include limits on the amounts for the authorizations and corresponding transactions (e.g., for the current authorization individually, for the current authorization and prior authorizations linked to the same AAV and/or account in the aggregate (e.g., based on an aggregate transaction amount, etc.), limits on the number of authorizations or transactions (as velocity limits), suitable interval limits, or combinations thereof.

For example, when the merchant 102 registers for enhanced authentication or is associated with enhanced authentication (e.g., by installation of 3DSS 114, etc.), the merchant 102 may have the option to impose one or more merchant authentication parameters, which indicates, as described above, conditions associated with authentication with regard to transactions at the merchant 102. For instance, the merchant 102 may request the AAV for a given interaction to be valid for an interval, such as, for example, 10 days, 90 days, 180 day, or more or less, etc., depending, for example, on the type of merchant, a routine transaction timing, etc. The merchant 102 may further request that authentications be valid for a number of transactions (or more specifically, authorizations). For example, a merchant may initiate five recurring transaction over an interval based on the same authentication. In this manner, the merchant may request that the authentication remain valid for 1-2 authorizations, 3-6 authorizations, 7-12 authorizations, or more or less authorization, etc. The merchant may further request an amount limit be permitted under an authentication, whereby subsequent authorizations are totaled (or aggregated), by the DMP 120, and authentication is valid until the amount limit is reached and invalid after the amount limit is exceeded (e.g., as performed in combination with steps 516 and/or 522 or in place thereof, etc.). It should be appreciated, as noted above, that multiple of the authentication parameters may be employed together, such that, for example, an amount limit may be imposed for an interval (e.g., whereby once the authenticated amount limit is exceed, even if the first time and/or within an interval corresponding to another authentication parameter, the verification will be invalid, etc.).

As such, when the authorization request is received (either before or after step 408 in the method 400), the DMP 120 may increment or decrement a count associated with the transaction ID and/or AVV, and if the count violates a merchant authentication parameter (or a default authentication parameter), the DMP 120 may append a tag indicating a violation of the parameter to the authorization request (or invalid authentication), or potentially, stand-in for the issuer 110 in declining the transaction, etc.

Additionally, or alternatively, the DMP 120 may determine a time lapse between the authentication (e.g., based on the date upon which the transaction ID and the AAV are stored, etc.) and the present day, and if the time lapse violates an interval included in the authentication parameters, the DMP 120 may append a tag indicating a violation of the parameter to the authorization request (or an indication of invalid authentication), or potentially, stand-in for the issuer 110 in declining the transaction, etc. Furthermore, the DMP 120 may determine an amount-to-date associated with the transaction ID and/or AAV by adding the transaction amount to previous authorizations associated with the transaction ID and/or AAV, if any, and compare the amount to data to an amount limit included in the authentication parameters. If the amount limit is violated, the DMP 120 may append a tag indicating a violation of the parameter to the authorization request (or an invalid authentication), or potentially, stand-in for the issuer 110 in declining the transaction, etc.

It should be appreciated that the authentication parameters may be applied, at operation 410 or otherwise in the method 400, again in lieu of one or more parts of the logic 500 illustrated in FIG. 5. Specifically, for example, and as described above, the authentication parameters may be employed in lieu of the determinations made at 516 and/or 522 related to transaction amounts, whereby an aggregate transaction amount for transactions having the same AAV and/or transaction ID, is compared to an amount limit which is equal to the transaction amount associated with authentication of the transaction. The parameters, in doing so, may further include, in combination, interval limits and number limits (e.g., velocity controls, etc.). The DMP 120, in connection therewith, may then further append a tag indicative of the result of the parameters, as above, to inform the issuer 110 of the result of the parameters.

It should be appreciated that other authentication parameters may be employed by the DMP 120, or the payment network 112, to permit the transaction ID and/or AAV to be used for recurring transactions, split shipment transactions, multi-merchant transactions, or other suitable types of the transactions, etc., as applicable and permitted by the user 104, the issuer 110 and/or the DMP 120, etc. In at least one embodiment, however, the DMP 120, or the payment network 112, may omit application of the authentication parameters.

With further reference to FIG. 4, the payment network 112 in turn transmits the authorization request to the issuer 110, at 412. The request includes, for example, the transaction details, the AAV, and one or more tags, as applied by the DMP 120, if applicable.

In response, the issuer 110 validates the IAV from the AAV based on a shared key between the issuer 110 and the ACS 118 (i.e., the key used to generate the IAV), and, potentially, performs one or more assessments for the transaction. The additional assessments may include evaluating the tag included in the request, etc. Based on the IAV, the tag, and/or other details included in the request, the issuer 110 determines, at 414 whether to approve or decline the transaction. Thereafter, the issuer 110 compiles an authorization response for the transaction and transmits the authorization response, at 416, back to the payment network 112. The payment network 112 then transmits, at 418, the authorization response to the acquirer 108, and the acquirer 108 transmits, at 420, the authorization reply to the merchant 102. The merchant 102, depending on the result, may then deliver the product to the user 104, or seek alternate funding for the transaction, depending on the approval or decline of the transaction by the issuer 110.

It should be appreciated that in the description of FIG. 4, above, the DMP 120 provides authentication verification services, generally automatically in the above example, as part of routing an authorization request from the acquirer 108 to the issuer 110. It should be appreciated, though, that a request for authentication verification may be otherwise. Specifically, as shown in FIG. 4, a particular service request may be received by the payment network 112, at 422, (as indicated by the dotted, arrowed line), from an issuer (e.g., the issuer 110, another issuer, etc.) when the issuer receives an authorization request for a transaction, via an alternate payment network (i.e., separate from the payment network 112 in the above example). The service request may be provided to the payment network 112 as an API call, or may be provided to the payment network 112 via an interface processor of the payment network 112 (e.g., a MIP, etc.), as an ISO-formatted message (e.g., ISO-8583 message, etc.), as an out-of-network service call, etc.

In connection therewith, the request includes the same data as indicated in an authorization request through the payment network 112. Specifically, the service request includes an AAV, a transaction ID, a transaction amount and a transaction currency. Upon receipt, the DMP 120, or the payment network 112, performs steps 408 and/or 410, whereby a service response is generated. The service response includes a tag, for example, as defined by the logic 500 of FIG. 5 and/or the authentication parameters for the merchant involved in the transaction. The DMP 120, or payment network 112, then transmits, at 424, (as indicated by the dotted, arrowed line) the service response to the issuer, in response to the service request including the tag(s) or other suitable content (whereby the issue may then rely on the serviced response in connection with approving or declining the transaction involved in the service request).

That said, example embodiments of the present disclosure generally relate to computer-implemented methods for use in associating an authentication and an authorization in connection with a network interaction. In one example embodiment, such a computer-implemented method generally includes one or more of: receiving, by at least one computing device, an authorization request for a network interaction from an acquirer computing device, the authorization request including an account identifier for a payment account involved in the network interaction (and, in some implementations, also a transaction amount for the network interaction); determining, by the at least one computing device, whether the authorization request includes an accountholder authentication value (AAV); determining, by the at least one computing device, whether the authorization request includes a transaction identifier (ID); in response to the authorization request including the AAV and the transaction ID: (i) determining, by the at least one computing device, whether the AAV and the transaction ID are included in a data structure of the network; (ii) in response to the AAV and the transaction ID being included in the data structure, determining, by the at least one computing device, whether a currency included in the data structure and associated with the transaction ID and the AAV is consistent with a currency included in the authorization request; and (iii) in response to at least the currency included in the data structure being inconsistent with the currency included in the authorization request, appending, by the at least one computing device, a tag to the authorization request and transmit the authorization request to an issuer of the payment account, the tag indicative of a currency mismatch in the authorization request.

In another example embodiment, a computer-implemented method for use in associating an authentication and an authorization in connection with a network interaction generally includes one or more of: receiving, by at least one computing device, an authorization request for a network interaction from an acquirer computing device, the authorization request representing a transaction to a payment account and including a transaction amount for the network interaction and an accountholder authentication value (AAV) indicative of a prior authentication associated with the transaction; determining, by the at least one computing device, whether the authorization request, the transaction amount and/or an interval associated with the authorization request satisfies at least one parameter, wherein the at least one parameter includes a merchant authentication parameter and/or a default authentication parameter; and in response to the authorization request, the transaction amount and/or the interval associated with the authorization request failing to satisfy the at least one parameter, appending, by the at least one computing device, a tag to the authorization request and transmit the authorization request to an issuer of the payment account, the tag indicative of the at least one parameter.

In another example embodiment, a computer-implemented method for use in associating an authentication and an authorization in connection with a network interaction generally includes one or more of: receiving, by at least one computing device, a service request for a network interaction, from an issuer of a payment account, apart from an interface processor, the service request including an accountholder authentication value (AAV) indicative of a prior authentication, a transaction identifier (ID) for a transaction, and at least one of a transaction amount and a currency for the transaction; verifying, by the at least one computing device, the at least one of the transaction amount and the currency in a data structure, based on the AAV and the transaction ID; and compiling and transmitting, by the at least one computing device, a service response, to the issuer, in response to the service request, indicating verification of the at least one of the transaction amount and the currency.

Example embodiments of the present disclosure also generally relate to non-transitory computer-readable storage media including executable instructions for use in assessing parties. In connection therewith, in one example embodiment, a non-transitory computer-readable storage medium includes executable instructions for use in assessing parties, whereby when the instructions are executed by at least one processor, they cause the at least one processor to: receive an authorization request for a network interaction from an acquirer computing device, the authorization request including an account identifier for a payment account involved in the network interaction (and, in some implementations, also a transaction amount for the network interaction); determine whether the authorization request includes an accountholder authentication value (AAV); determine whether the authorization request includes a transaction identifier (ID); in response to the authorization request including the AAV and the transaction ID: (i) determine whether the AAV and the transaction ID are included in a data structure of the network; (ii) in response to the AAV and the transaction ID being included in the data structure, determine whether a currency included in the data structure and associated with the transaction ID and the AAV is consistent with a currency included in the authorization request; and (iii) in response to at least the currency included in the data structure being inconsistent with the currency included in the authorization request, append a tag to the authorization request and transmit the authorization request to an issuer of the payment account, the tag indicative of a currency mismatch in the authorization request.

In another example embodiment, a non-transitory computer-readable storage medium includes executable instructions for use in assessing parties, which when executed by at least one processor, cause the at least one processor to receive an authorization request for a network interaction from an acquirer computing device, the authorization request representing a transaction to a payment account and including a transaction amount for the network interaction and an accountholder authentication value (AAV) indicative of a prior authentication associated with the transaction; determine whether the authorization request, the transaction amount and/or an interval associated with the authorization request satisfies at least one parameter, wherein the at least one parameter includes a merchant authentication parameter and/or a default authentication parameter; and in response to the authorization request, the transaction amount and/or the interval associated with the authorization request failing to satisfy the at least one parameter, append a tag to the authorization request and transmit the authorization request to an issuer of the payment account, the tag indicative of the at least one parameter.

In another example embodiment, a non-transitory computer-readable storage medium includes executable instructions for use in assessing parties, which when executed by at least one processor, cause the at least one processor to receive a service request for a network interaction, from an issuer of a payment account, apart from an interface processor, the service request including an accountholder authentication value (AAV) indicative of a prior authentication, a transaction identifier (ID) for a transaction, and at least one of a transaction amount and a currency for the transaction; verify the at least one of the transaction amount and the currency in a data structure, based on the AAV and the transaction ID; and compile and transmit a service response, to the issuer, in response to the service request, indicating verification of the at least one of the transaction amount and the currency.

In view of the above, the systems and methods and computer-readable storage media herein uniquely provide for linking authentications of users to subsequent authorizations of transactions performed by the users. In particular, the systems and methods provide for matching between the authentications of users and the authorizations of transactions performed by the users, as an authentication verification service, in the context of enhanced authentication, to further ensure that the resulting transactions are actually performed by the authenticated users. In connection therewith, particular combinations of data associated with the authentications and the authorizations are utilized, in a new and unique way, to confirm the relationship between the original authentications and the subsequent authorizations (e.g., transaction IDs, AAVs, transaction amounts, currency types, etc.). Such specific combinations of data, as evaluated in the specific manner herein, provides for a substantially high level of confidence that the results of the service are accurate. And then, the results from the matching/evaluation are compiled and included in the corresponding authorization requests for the transactions, and are transmitted to corresponding issuers, whereby the issuers are able to account for the matching in determining whether or not to approve the transactions. In this way, the methods and systems herein provide the issuers with new data not previously available, that can then be used in the approval process for the transactions.

In addition to the above, in embodiments herein, the systems and methods of the present disclosure also implement authentication parameters in connection with evaluating the combinations of data associated with the authentications and authorizations, to provide different degrees of flexibility for merchants, users, issuers, etc. in implementing the authentication verification service (whereby the service may be tailored to the merchants, users, issuers, etc. as opposed to a "one-size-fits-all" implementation). Further, the authentication verification service may be implemented automatically for transactions processed through particular payment networks, or it may be specifically called by issuers in connection with evaluating transactions processed to the issuers via different payment networks (whereby the different payment networks may not offer such an authentication verification service). In this way, the present disclosure provides even further flexibility to issues to avail additional transactions to the authentication verification service of the present disclosure.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the operations as recited herein and/or in the following claims, including, for example (and without limitation): (a)

receiving an authorization request for a network interaction from the acquirer, the authorization request including a primary account number (PAN) for a payment account and a transaction amount for the network interaction; (b) determining whether the authorization request includes an accountholder authentication value (AAV); (c) determining whether the authorization request includes a transaction identifier (ID); (d) in response to the authorization request including the AAV and the transaction ID: (i) determining whether the AAV and the transaction ID are included in a data structure of the network; (ii) in response to the AAV and the transaction ID being included in the data structure, determining whether a currency included in the data structure and associated with the transaction ID and the AAV is consistent with a currency included in the authorization request; and (iii) in response to at least the currency included in the data structure being inconsistent with the currency included in the authorization request, appending a tag to the authorization request and transmit the authorization request to an issuer of the payment account, the tag indicative of a currency mismatch in the authorization request.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one of: (a) receiving an authorization request for a network interaction from an acquirer, the authorization request representing a transaction to a payment account and including a transaction amount for the network interaction and an accountholder authentication value (AAV) indicative of a prior authentication associated with the transaction; (b) determining whether the authorization request, the transaction amount and/or an interval associated with the authorization request satisfies at least one parameter, wherein the at least one parameter includes a merchant authentication parameter and/or a default authentication parameter; and (c) in response to the authorization request, the transaction amount and/or the interval associated with the authorization request failing to satisfy the at least one parameter, appending a tag to the authorization request and transmit the authorization request to an issuer of the payment account, the tag indicative of the at least one parameter.

As will further be appreciated based on the foregoing specification, the above-described embodiments of the disclosure may be implemented using computer programming or engineering techniques including computer software, firmware, hardware or any combination or subset thereof, wherein the technical effect may be achieved by performing at least one of: (a) receiving a service request for a network interaction, from an issuer of a payment account, apart from an interface processor, the service request including an accountholder authentication value (AAV) indicative of a prior authentication, a transaction identifier (ID) for a transaction, and at least one of a transaction amount and a currency for the transaction; (b) verifying the at least one of the transaction amount and the currency in a data structure, based on the AAV and the transaction ID; and (c) compiling and transmitting a service response, to the issuer, in response to the service request, indicating verification of the at least one of the transaction amount and the currency.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9, and so forth.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in associating an authentication and an authorization in connection with a network interaction, the system comprising:
   a network in communication with an acquirer computing device, the network including at least one computing device configured to:
      receive an authorization request for a network interaction from the acquirer computing device, the authorization request including an account identifier for a payment account involved in the network interaction;
      determine whether the authorization request includes an accountholder authentication value (AAV), wherein the AAV is unique to the network interaction;
      determine whether the AAV is a first type of AAV or a second type of AAV;
      in response to the AAV being the second type of AAV, determine whether the authorization request includes a transaction identifier (ID), wherein the transaction ID is unique to the network interaction; and
      in response to the authorization request including both the AAV and the transaction ID:
         determine whether the AAV and the transaction ID are included in a data structure of the network;
         in response to the AAV and the transaction ID being included in the data structure, determine whether a currency included in the data structure and associated with the transaction ID and the AAV is consistent with a currency included in the authorization request; and
         in response to at least the currency included in the data structure being inconsistent with the currency included in the authorization request, append a tag to the authorization request and transmit the authorization request to an issuer of the payment account, the tag indicative of a currency mismatch in the authorization request.

2. The system of claim 1, wherein the at least one computing device is further configured, in response to the authorization request including the AAV and the transaction ID, and in response to the AAV being included in the data structure but the transaction ID not being included in the data structure, to append a second tag to the authorization request and transmit the authorization request to the issuer of the payment account, the second tag indicative of a valid AAV and an invalid transaction ID in the authorization request.

3. The system of claim 2, wherein the at least one computing device is further configured, in response to the authorization request including the AAV and the transaction ID, and in response to the AAV not being included in the data structure but the transaction ID being included in the data structure, to append a third tag to the authorization request and transmit the authorization request to the issuer of the payment account, the third tag indicative of an invalid AAV and a valid transaction ID in the authorization request.

4. The system of claim 3, wherein the at least one computing device is further configured to:
   in response to the authorization request including the AAV and the transaction ID, and in response to at least the currency included in the data structure being consistent with the currency included in the authorization request, determine whether a transaction amount in the authorization request is a match, a partial match or a mismatch, as compared to a transaction amount included in the data structure and associated with the transaction ID and the AAV; and
   append a fourth tag to the authorization request and transmit the authorization request to the issuer of the payment account, the fourth tag indicative of the match, the partial match or the mismatch of the transaction amount included in the data structure relative to the transaction amount in the authorization request.

5. The system of claim 4, wherein the at least one computing device is further configured to:
   in response to the authorization request including the AAV and the transaction ID, and in response to at least the currency included in the data structure being consistent with the currency included in the authorization request, compare a transaction amount in the authorization request to an amount limit associated with the transaction ID and/or the AAV; and
   append a fifth tag to the authorization request and transmit the authorization request to the issuer of the payment account, the fifth tag indicative of the transaction amount exceeding or not exceeding the amount limit.

6. The system of claim 5, wherein the amount limit relates to an aggregation of transaction amounts associated with the transaction ID and/or the AAV for an interval.

7. The system of claim 4, wherein the at least one computing device is further configured to append a fifth tag to the authorization request and transmit the authorization request to the issuer of the payment account, in response to the authorization request including the transaction ID and the AAV but the transaction ID and the AAV being absent from the data structure; and
   wherein the fifth tag is indicative of the AAV present in the authorization request being expired.

8. The system of claim 1, wherein the second type of AAV includes a Secure Payment Authentication v2 Accountholder Authentication Value.

9. The system of claim 1, wherein the at least one computing device is further configured to:
   in response to the authorization request including the AAV and the transaction ID, to determine whether the AAV is included in the data structure; and then
   in response to the AAV included in the authorization request being included in the data structure, determine whether the currency included in the data structure and associated with the transaction ID and the AAV is consistent with the currency included in the authorization request.

10. The system of claim 1, wherein the authorization request is consistent with an ISO 8583 standard message.

11. The system of claim 1, wherein the at least one computing device is further configured to apply one or more authentication parameters to the authorization request and append one or more additional tags to the authorization request, based on the one or more authentication parameters, prior to transmitting the authorization request to the issuer.

\* \* \* \* \*